United States Patent [19]

Cervelli et al.

[11] Patent Number: 5,618,002
[45] Date of Patent: Apr. 8, 1997

[54] TRUCK WITH RETRACTABLE SPREADER MECHANISM

[75] Inventors: Gary Cervelli, Coram; Walter K. Titcomb, Ronkonkoma, both of N.Y.

[73] Assignee: Air-Flo Mfg. Co. Inc., Prattsburg, N.Y.

[21] Appl. No.: 602,080

[22] Filed: Feb. 15, 1996

[51] Int. Cl.⁶ .............................. B60P 1/36; B65G 31/04
[52] U.S. Cl. ........................................ 239/657; 239/672
[58] Field of Search ................................... 239/657, 672; 298/7; 414/528

[56] References Cited

U.S. PATENT DOCUMENTS

| | | | |
|---|---|---|---|
| 3,189,355 | 6/1965 | Swenson et al. | 239/657 |
| 3,620,458 | 11/1971 | Rath | 239/657 |
| 4,886,214 | 12/1989 | Musso, Jr. et al. | 239/657 X |
| 5,310,119 | 5/1994 | Musso, Jr. et al. | 239/657 X |
| 5,397,172 | 3/1995 | Musso, Jr. et al. | 298/22 R |
| 5,400,974 | 3/1995 | Musso, Jr. et al. | 239/657 X |

FOREIGN PATENT DOCUMENTS 5-76224  3/1993  Japan ..................................... 239/676

Primary Examiner—Karen B. Merritt
Assistant Examiner—Janice L. Krizek
Attorney, Agent, or Firm—Chilton, Alix & Van Kirk

[57] ABSTRACT

A spreader mechanism having a rear operating position for spreading the material discharged from the truck body at the rear end of the truck body and a forward storage position clear of the rear end of the truck body. According to the invention, the spreader support has at least one longitudinally extending leg support mounted on the truck frame for longitudinal movement of the spreader between the rearward operating position and a forward storage position forward of the tailgate of the truck body.

19 Claims, 5 Drawing Sheets

TRUCK WITH RETRACTABLE SPREADER MECHANISM

BACKGROUND OF THE INVENTION

The present invention generally relates to truck spreader mechanisms and has notable utility in trucks of the type having a truck body with a longitudinally extending endless conveyor for conveying the material contents of the truck body rearwardly for discharging the contents at the rear end of the truck body.

U.S. Pat. No. 5,397,172 which issued on Mar. 14, 1995 for "Truck Body With Integrated Conveyor System" discloses a known example of a truck for hauling and dispensing material over paved roads, fitted with an integrated spreader. The spreader mechanism includes a post rigidly connected to one of the longitudinally extending rails of the truck frame and a spinner mechanism at the lower end of the post which may be pivoted manually between a storage position and an operating position.

SUMMARY OF THE INVENTION

The present invention relates more particularly to a new and improved spreader mechanism having a rear operating position for spreading the material discharged from the truck body at the rear end of the truck body and a forward storage position clear of the rear end of the truck body. According to the invention, the spreader support has at least one longitudinally extending leg support mounted on the truck frame for longitudinal movement of the spreader between the rearward operating position and a forward storage position forward of the tailgate of the truck body.

DESCRIPTION OF THE PREFERRED EMBODIMENT

Figure 1:
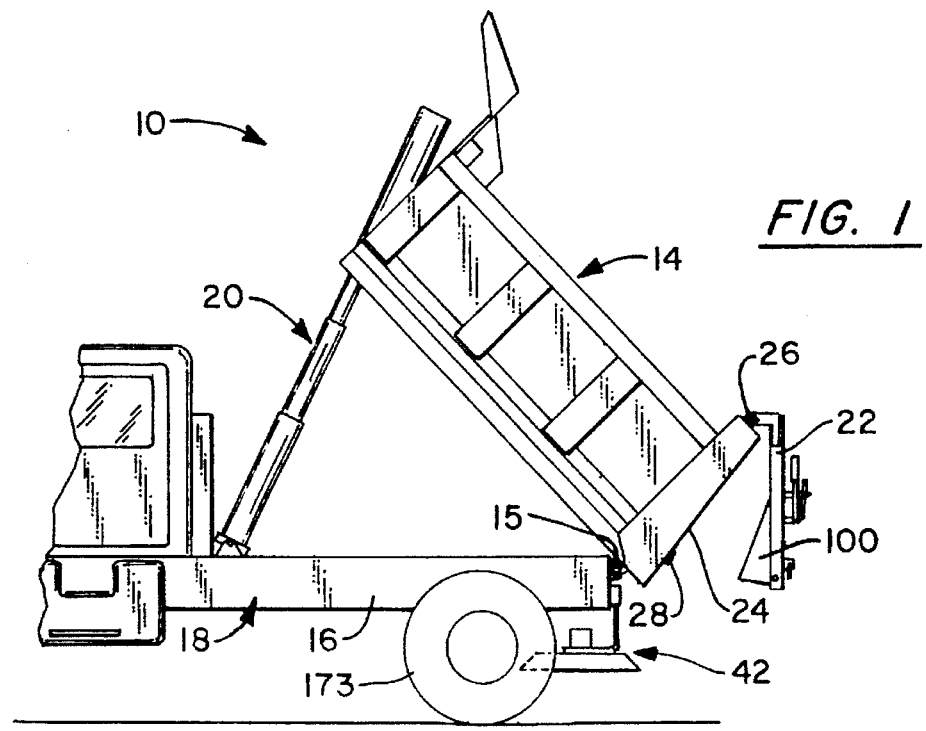
FIG. 1 is a side elevation view of a dump truck having a retractable spreader mechanism incorporating a manually operated embodiment of the present invention and showing a dump body of the truck in a fully raised position, the tailgate of the dump body in an open hanging position, and the spreader mechanism in a forward storage position.
Figure 2:
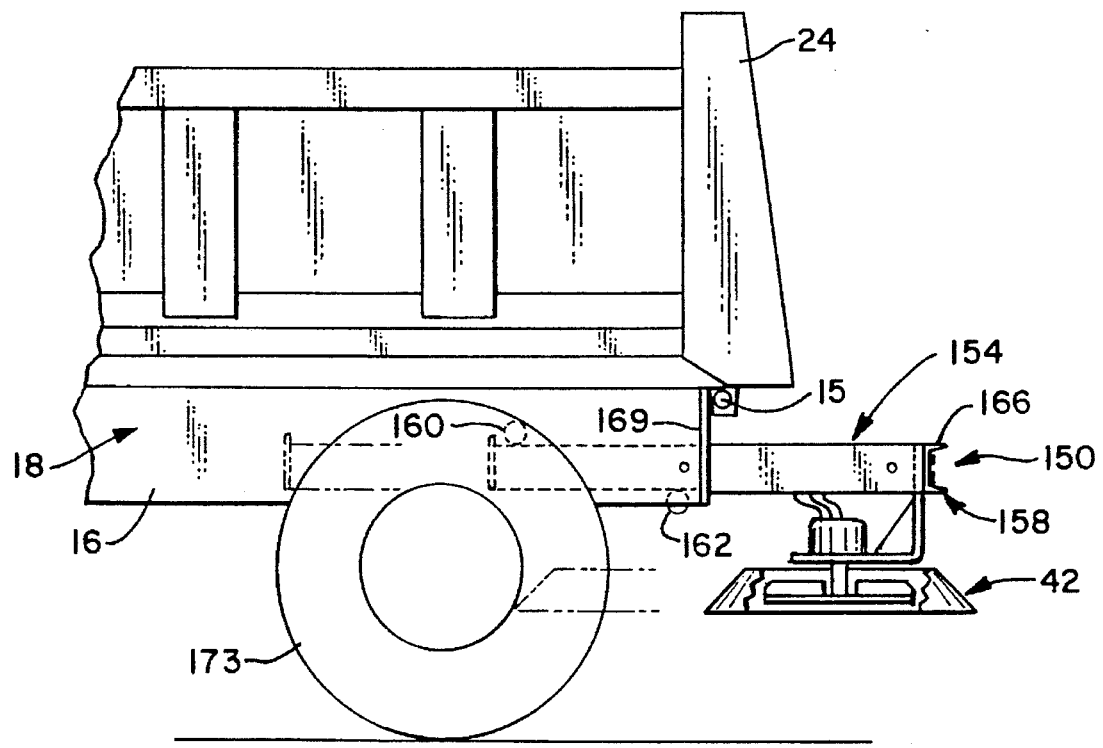
FIG. 2 is an enlarged, partial side elevation view of the dump truck of FIG. 1, showing the dump body in the lowered normal position and the spreader mechanism in a rear operating position.
Figure 3:
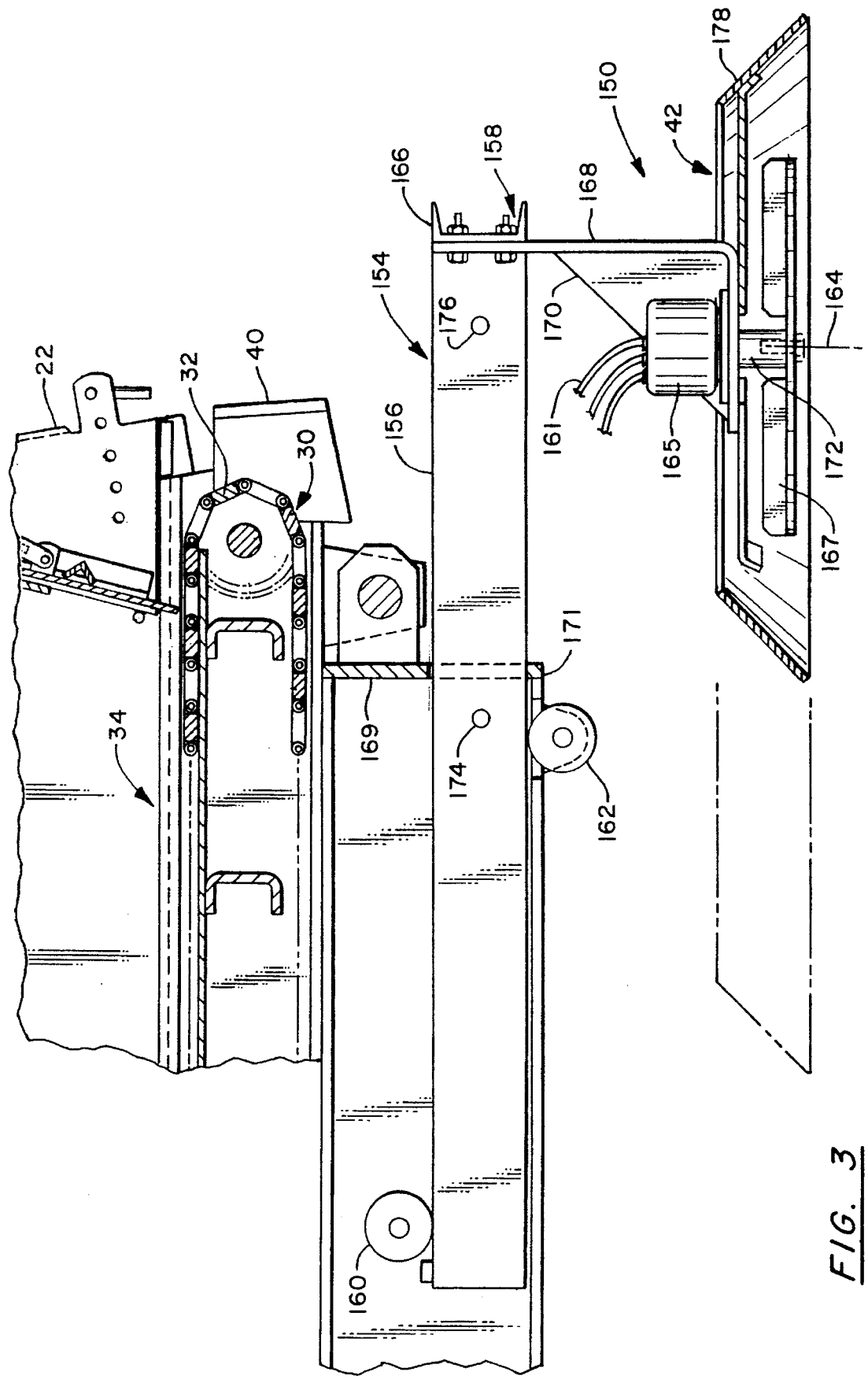
FIG. 3 is an enlarged, partial side elevation view of the support structure for the manually retractable spreader mechanism, in the extended, operating position of FIG. 2.

In the drawings, like numerals are used to designate the same or like parts.

A dump truck 10, incorporating a first, manually actuated embodiment of the present invention, is shown in FIGS. 1–4. A dump body 14 is mounted on a truck frame 18 for pivotal movement about a rear pivot axis 15 between a normal or horizontal position resting on a pair of longitudinally extending beams 16 of the truck frame 18 and a raised dump position. A telescopic lift cylinder 20 is connected between the truck frame 18 and forward end of the dump body 14 to hydraulically raise and lower the dump body 14 in a conventional manner.

The dump body 14 has a rear tailgate 22 which, in its closed position, is held in engagement with the rear end faces of the upright sides 24 of the dump body 14. In a conventional manner, the tailgate 22 can be mounted on the sides 24 of the dump body 14 for pivotal movement about a transverse horizontal axis at either the top or bottom of the tailgate opening. In FIG. 1, the tailgate 22 is shown mounted for pivotal movement about a transverse horizontal axis at the top of the tailgate opening. For that purpose, a pair of pivot pins 26 are inserted into cooperating bearings mounted on the tailgate 22 and dump body sides 24. Conventional latches 28 are provided for latching the tailgate 22 in its closed position and to selectively mount the tailgate 22 for pivotal movement about a transverse horizontal axis at the bottom of the tailgate opening. The two latches 28 comprise a pair of coaxial stub shafts welded to the tailgate 22 and a pair of manually operated couplings mounted on the sides 24 for latching the stub shafts to the sides 24.

In one mode of operation of the dump body 14, the tailgate latches 28 are unlatched to dump the material contents of the dump body 14 through the tailgate opening when the dump body 14 is raised by the lift cylinder 20. In another mode of operation, the tailgate 22 has a flat open position extending rearwardly from the bottom of the dump body 14. For that mode of operation, after closing the latches 28, the upper pivot pins 26 are removed and the tailgate 22 is manually lowered to its flat open position. That procedure is reversed for remounting the tailgate 22 for pivotal movement about the upper transverse axis.

A conveyor system 30 is integrated into the tailgate 22 and bottom structure 34 of the dump body 14 to provide a multiple purpose truck which can be used in a conveyor dispensing mode of operation (as well as the other two described modes of operation). The integrated conveyor system 30 is preferably like that described in U.S. Pat. No. 5,397,172, granted Mar. 14, 1995, and entitled "Truck Body With Integrated Conveyor System", the specification of which is incorporated herein by reference. The conveyor system 30 comprises a central, longitudinally extending endless conveyor 32 in the bottom structure 34 of the dump body 14 and a rear conveyor hood assembly 100 mounted on the tailgate 22. A suitable discharge chute 40 (mounted in part on the truck frame 18 below the rear end of the conveyor 32) is provided for directing the material contents of the truck body 14 (discharged off the conveyor 32 at the rear end of the truck body 14) downwardly onto a spreader 42.

The spreader 42 forms part of a spreader mechanism 150 mounted on the parallel channel beams 16 of the truck frame 18. The spreader mechanism 150 has a rigid, support frame 154 preferably including a pair of longitudinally extending support legs 156a,b and a transverse rear end structure 158. The two support legs 156 are provided by parallel channel beams mounted on the main channel beams 16a,b of the truck frame 18 for linear movement parallel to the longitudinal axis of the truck and below the dump body 14. Suitable roller bearings 160, 162, track guide rails, or telescoping structures are provided between the truck beams 16 and support leg beams 156 to facilitate longitudinal movement of the support frame 154 on the truck beams 16. The support leg beams 156 are approximately two to three feet apart and directly below the lateral edges of the endless conveyor 32.

The rear end structure 158 comprises a transverse channel beam 166 and one or two intermediate, laterally spaced mounting brackets 168 attached to and extending down from beam 166. The spreader 42 thereby depends via the bracket 168, from the support legs 156. The rear end structure 158 can be permanently welded to the rear ends of the two leg supports 156 or optionally connected by pins or the like so as to be interchangeable with a pan attachment (not shown). Optionally, another rear channel beam can be mounted rearwardly of cross beam 166 to serve as a rear truck bumper (in both the front storage position and rear operating position of the spreader mechanism 150). Also, a plate or the like can optionally be mounted directly or indirectly on support frame 154, to cooperate with the discharge chute 40.

The spreader 42 is mounted below the support legs 156, centrally therebetween and with the axis 164 of the spinner 167 rotation normal to the generally horizontal plane of the beams 16 and support legs 156. A hydraulic drive motor 165 is mounted on a transverse spinner support bracket 170 with its drive shaft 172 extending upwardly through an opening in the spinner support bracket 170. The spinner 167 is mounted on and secured to the drive shaft 172 for rotation by the motor 165. The hydraulic motor 165 and hydraulic lines 161 leading to and from the motor 165 are part of a hydraulic system (having a manually operated valve and hydraulic pump, not shown) used for selectively rotating the spinner 167 with the motor 165. The hydraulic lines are preferably mounted within the channel openings in the support legs 156 to protect the hydraulic lines and keep them free and clear of the dump body 14.

The spreader mechanism 150 has a rear, extended, operating position (shown in FIGS. 2, 3 and 4) with the support legs 156 extending longitudinally outwardly from the beams 16 and with the spinner 167 lying directly below the rear end of the conveyor 32. The spreader support frame 154 is locked in this rear operating position against longitudinal movement on the beams 16 by a suitable locking mechanism, for example by pins inserted between the support legs 156 and the rails 16 through opening 174.

Figure 4:
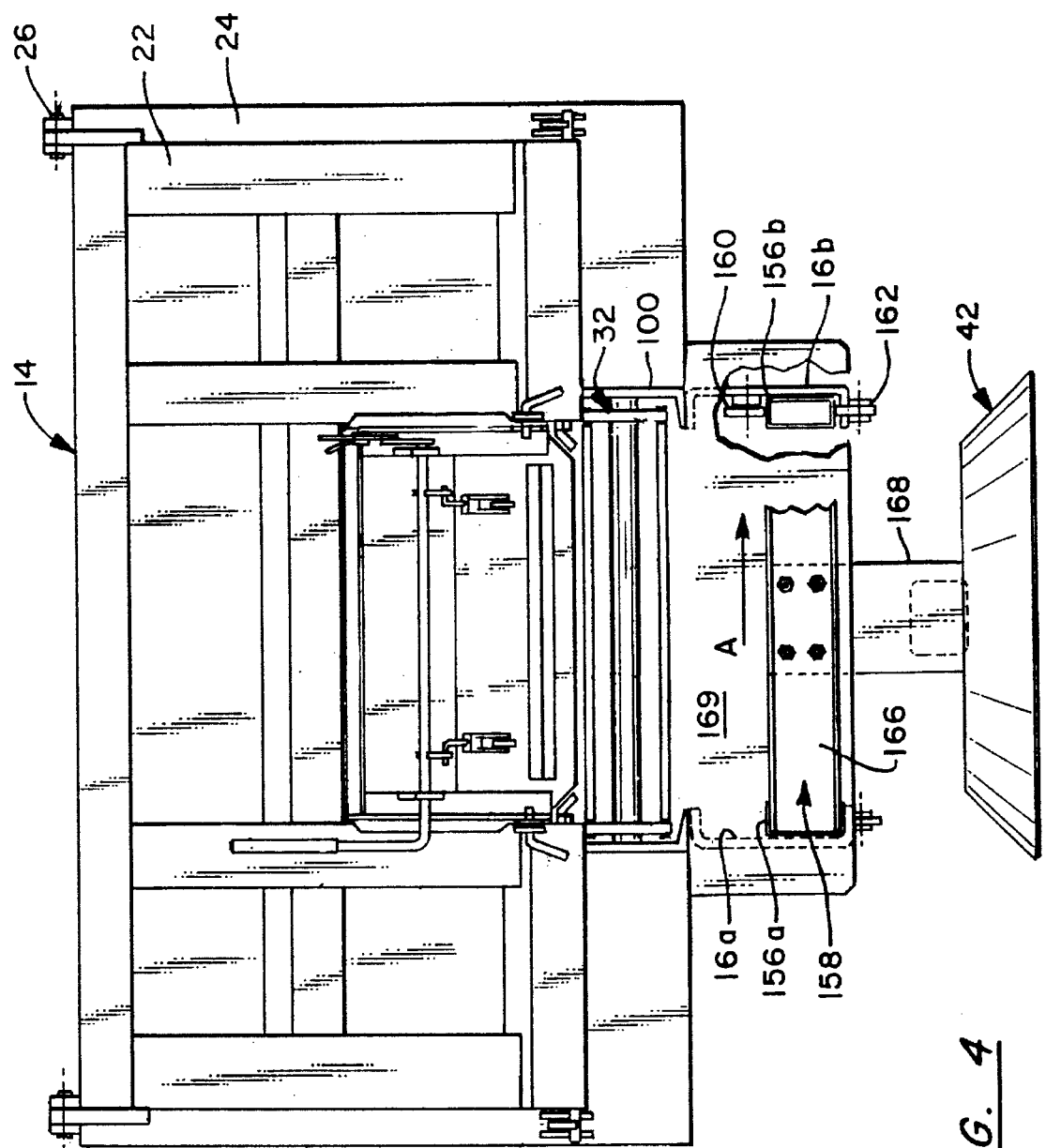
FIG. 4 is an enlarged, partial rear end view, partly broken away and partly in section, of the dump truck of FIG. 1, showing the dump body in its lower normal position and the spreader mechanism in its rear operating position.

With the tailgate 22 closed, with the dump body 14 in its lower position and with the spreader support frame 154 locked in its rear operating position, the spinner 167 is positioned centrally between the sides 24 of the dump body 14 directly below the discharge chute 40 and the rear end of the conveyor 32. In FIG. 4, the chute has been omitted for clarity. The spreader 42 is thereby positioned for receiving the material contents of the truck body discharged off the conveyor 32 at the rear end of the truck body and passing downwardly through the chute 40. When the conveyor system 30 is operated to discharge the material contents of the truck body off the rear end of the conveyor 32, the spinner 167 is rotated by its drive motor 165 to spread the discharged material onto the roadway.

The spreader mechanism 150 has a forward or retracted storage position with the transverse beam 166 substantially abutting an end plate 169 at the rear ends 171 of the truck beams 16. In this storage position, the support legs 156 are stored within the channel openings in the truck beams 16 and the spreader 42 is stored in a generally horizontal plane below the beams 16 and generally between the rear wheels 173 of the truck 10 immediately behind the differential. Also, the rear end structure 158 is positioned below the conveyor 32 and free and clear of the dump body 14. The spreader support frame 154 is locked in this retracted storage position by the spreader locking mechanism, e.g., via pin through opening 176.

The spreader mechanism 150 can be manually shifted in the manner of a drawer between its rear operating position and forward storage position by unlocking the support frame 154, manually sliding the spreader mechanism 150 rearwardly or forwardly on the longitudinal beams 16 of the truck frame 18, and then relocking the support frame 154 in its new position.

It should be appreciated that a number of modifications and variations can be made to the particular implementation described above without departing from the spirit and scope of the invention.

The improvement relative to the known techniques arises from the spreader support having at least one longitudinally extending leg support mounted on the truck frame for longitudinal movement of the spreader between a rearward operating position and a forward storage position, forward of the rear end of the truck body. Once this novel feature is revealed to one of ordinary skill in this field, the implementation can take a variety of forms. For example, the diameter of the spinner 167 and associated deflector shield 178 are typically about 20 inches and 36 inches respectively, but this can be varied to accommodate, for example, the available distance between the rear wheel differential and the back end of the truck body. The distance of the spinner below the support leg, i.e., the length of support bracket 168, can also be varied to accommodate constraints or preferences. The spreader can be supported from only one leg, e.g., 156a, via only one bracket, or from both legs 156a, 156b via two brackets (not shown). The bracket(s) 168 could be supported directly or indirectly by both legs 156, or from cross plates or a bumper. The motor 165 could alternatively be situated on the underside of the spinner 167. The shield 178 could be rigidly or adjustably attached to the bracket 168, or could be supported from, e.g., the legs 156, by chains or the like (not shown) for independent vertical adjustment relative to the spinner 167.

Figure 5:
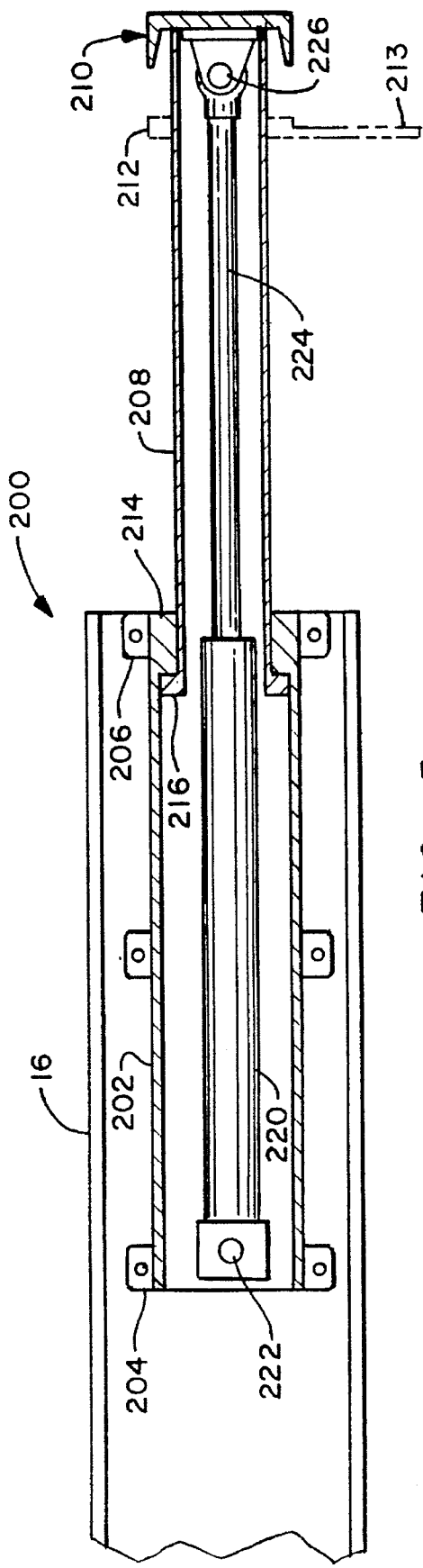
FIG. 5 is an enlarged, partial side elevation view, corresponding generally to FIG. 3, but showing the support structure and hydraulic actuator for another, automated embodiment of the invention.
Figure 7:
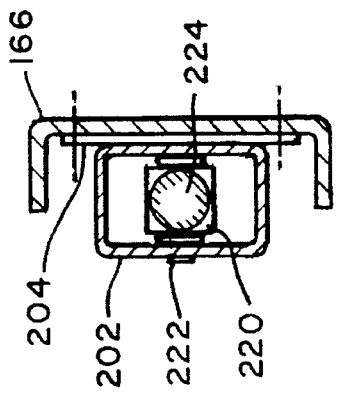
FIG. 7 is cross-section view taken through line 7—7 of FIG. 6.
Figure 6:
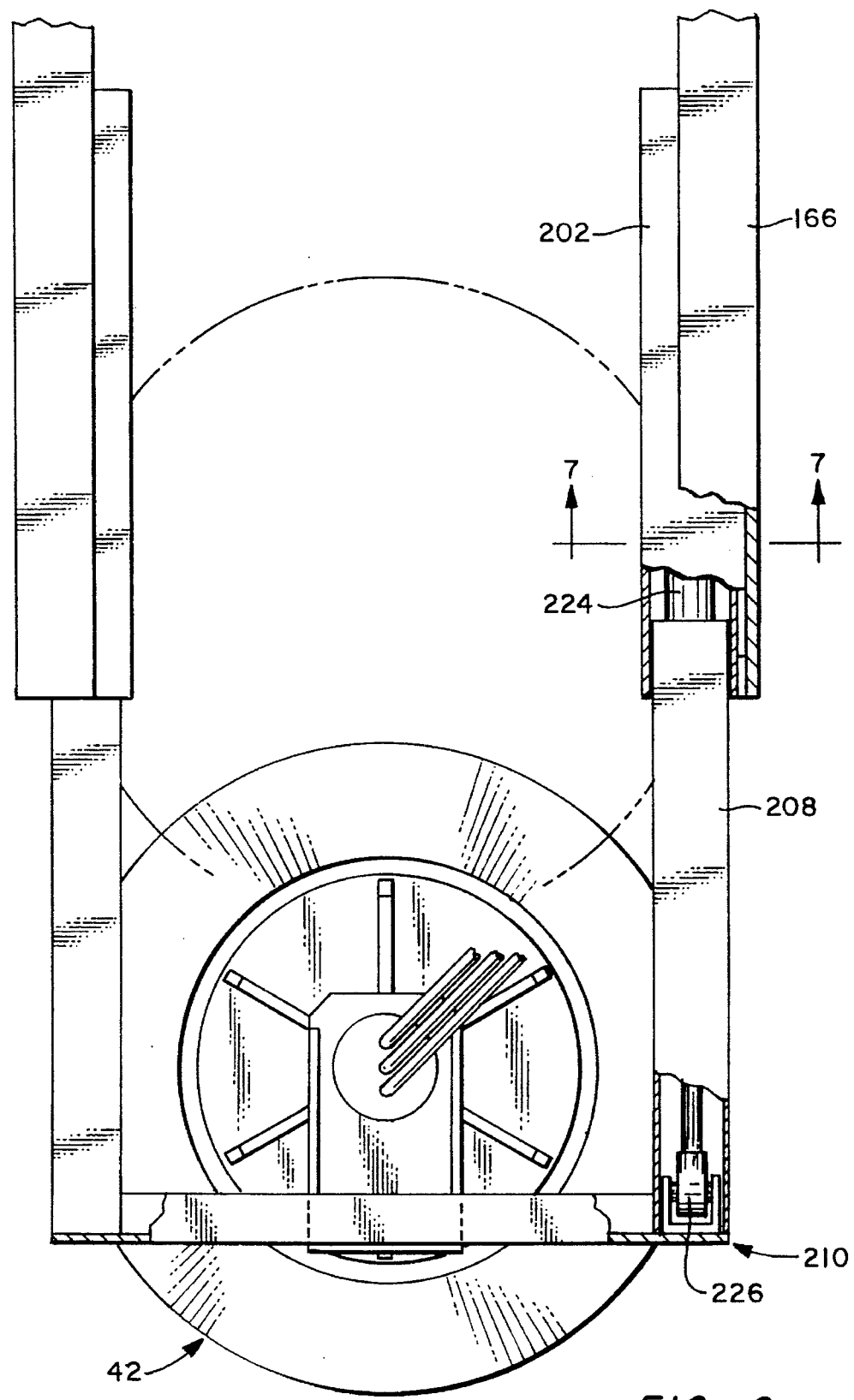
FIG. 6 is an enlarged, partial plan view, partly broken away, showing the support and actuation structure of the automated spreader mechanism in its rear operating position.

FIGS. 5–7 shown an alternative embodiment wherein the longitudinal shifting of the spreader mechanism between the storage position and the operating position is achieved automatically, in particular by the use of a hydraulic actuator system. Only the differences in the actuating technique between the automated embodiment and the manual embodiment will be described. It should be understood that the spreader and its connection to the support leg are not peculiar as to the way in which the support leg is shifted.

In the hydraulically actuated system 200, an anchoring leg 202 is rigidly mounted via tabs 204, 206 to one of the rails 16. Preferably, each rail carries its own anchoring leg and associated actuating support leg structure as described hereinbelow. A locating leg 208 is supported by the anchoring leg 202 for longitudinal movement, thereby shifting the rear end structure 210 from which the spreader depends, between the storage and operating positions. An optional cross plate 212 with the support bracket 213 for the spreader is shown in phantom. The anchoring leg 202 and locating 208 leg are preferably tubular and concentric or coaxial such that the locating tube 208 moves telescopically within the anchoring leg 202. A first guide block 214 is preferably rigidly supported at the rearward end of the tubular anchoring leg, and another guide 216 is preferably attached as a flange or the like to the forward end of the locating tube 208, such that as the tube 208 moves longitudinally within tube 202, the tube 208 will be supported at two axially spaced surfaces, which enhances rigidity and stability. A seal (not shown) can be provided at the rearward end of the anchoring leg, just forward of guide block 214, to prevent debris and the like from entering the interior of the anchoring leg 202.

A hydraulic cylinder 220 is rigidly affixed by a bracket 222 or the like to the anchoring leg 202, such that the cylinder extends coaxially with the anchoring tube 202 and the locating tube 208. The piston rod 224 of the piston cylinder 220 extends coaxially within the locating leg 208, with its free end attached at 226 to the rear end structure 210. Ideally, the arrangement and connections among the anchoring leg 202, locating leg 208, piston rod 224 and rear end structure 210 are such that the weight of the spreader is borne primarily by the end structure 210 and transferred via the locating leg 208 and guide members 214, 216 to the anchoring leg 202 for ultimate support by the rail 16. The piston rod 224 should experience a relatively small load due to the weight of the spreader, but rather is stressed only longitudinally during the shifting between the storage and operating positions of the spreader.

The hydraulic controls for the actuator can be readily designed. Such a control system can also include hydraulically actuated lock cylinders for inserting or retracting plungers between e.g., the anchoring leg 202 and the locating leg 208 at either of two axially spaced locations on the locating leg corresponding to the storage and operating positions of the spreader.

As will be apparent to persons skilled in the art, various modifications, adaptations and variations of the foregoing specific disclosure can be made without departing from the teachings of the present invention.

We claim:

1. In a truck having a truck frame with a pair of laterally spaced and longitudinally extending rails, a truck body having a forward end and a rearward end and pivotally mounted at the rearward end on the truck frame, lift means connected between the truck frame and truck body for raising and lowering the forward end of the truck body between a lower normal position resting on the truck frame and an upper raised position, the truck body forming a receptacle having a bottom and a rear tailgate opening and having a tailgate pivotal between an open position and a closed position closing the tailgate opening, the truck body having a bottom structure with an integrated, longitudinally extending, endless conveyor forming part of the bottom of the truck body receptacle, the conveyor being operable for longitudinally conveying material within the receptacle for dispensing the material at the rearward end of the truck body, and a spreader mechanism mounted on the truck having a spreader and a spreader support for shifting the spreader between an operating position for spreading the material dispensed at the rearward end of the truck body and a retracted storage position; the improvement wherein the spreader support has at least one longitudinally extending leg support mounted on the truck frame for longitudinal movement of the spreader between a rearward operating position and a forward storage position forward of the tailgate of the truck body.

2. A truck according to claim 1, wherein the spreader support comprises a pair of said longitudinally extending leg supports in laterally spaced parallel relationship supported by the pair of rails, respectively, of the truck frame.

3. A truck according to claim 2, wherein the laterally spaced rails of the truck frame are channel beams with lateral openings and wherein the leg supports are mounted within the lateral openings of the channel beams.

4. A truck according to claim 2, wherein each leg support comprises an anchoring leg rigidly connected to one rail and a locating leg which carries the spreader weight and is movable along the anchoring leg for transferring the weight of the spreader to the rail through the anchoring leg and shifting the spreader between the operating position and the storage position.

5. A truck according to claim 4, wherein reciprocable actuating means are mounted between the anchoring leg and the locating leg for moving the locating leg in parallel with said rail.

6. A truck according to claim 5, wherein said reciprocable actuating includes a hydraulic cylinder rigidly mounted to the anchoring leg and piston actuated by the cylinder and including a piston rod rigidly connected to the locating leg.

7. A truck according to claim 4, wherein the anchoring leg and the locating leg are coaxial tubes.

8. A truck according to claim 7, wherein the locating leg tube is supported externally by guide means which telescopically engage the interior of the anchoring leg tube.

9. In a truck having a truck frame with a pair of laterally spaced and longitudinally extending rails, a truck body having a forward end and a rearward end, and the truck body forming a receptacle having a bottom and a rear tailgate opening and having a tailgate pivotably mounted at a pivotal mounting for movement between an open position and a closed position thereof closing the tailgate opening, the truck body having a bottom structure with an integrated, longitudinally extending, endless conveyor forming part of the bottom of the truck body receptacle, the conveyor being operable for longitudinally conveying material within the receptacle for dispensing the material at the rearward end of the truck body, and a spreader mechanism mounted on the truck having a spreader and a spreader support for shifting the spreader between an operating position for spreading the material dispensed at the rearward end of the truck body and a retracted storage position; the improvement wherein the spreader support has at least one longitudinally extending leg support mounted on the truck frame for longitudinal movement of the spreader between a rearward operating position and a forward storage position forward of the pivotal mounting of the tailgate.

10. A truck according to claim 9 wherein the spreader support comprises a pair of said longitudinally extending leg supports in laterally spaced parallel relationship mounted on the pair of rails, respectively, of the truck frame.

11. A truck according to claim 10, wherein the laterally spaced rails of the truck frame are channel beams with lateral openings and wherein the leg supports are mounted within the lateral openings of the channel beams.

12. A truck according to claim 9, wherein each leg support comprises an anchoring leg rigidly connected to one rail and a locating leg which carries the spreader weight and is movable along the anchoring leg for transferring the weight of the spreader to the rail through the anchoring leg and shifting the spreader between the operating position and the storage position.

13. A truck according to claim 12, wherein the anchoring leg and the locating leg are coaxial tubes.

14. A truck according to claim 12, wherein reciprocable actuating means are mounted between the anchoring leg and the locating leg for moving the locating leg in parallel with said rail.

15. A truck according to claim 14, wherein said reciprocable actuating means includes a hydraulic cylinder rigidly mounted to the anchoring leg and piston actuated by the cylinder and including a piston rod rigidly connected to the locating leg.

16. In a truck for hauling and dispensing material over paved roads, the truck having a truck frame, a truck body having a forward end and a rearward end, and mounted on the truck frame, the truck body forming a receptacle for said material, means for dispensing the material at the rearward end of the truck body, and a spreader mechanism mounted on the truck having a spreader and a spreader support for shifting the spreader between an operating position for spreading the material dispensed at the rearward end of the truck body and a retracted storage position; the improvement wherein the spreader support has at least one longitudinally extending leg support mounted on the truck frame for longitudinal movement of the spreader between a rearward operating position and a forward storage position forward of the rear end of the truck body.

17. The truck according to claim 16, wherein the frame includes a pair of laterally spaced and longitudinally extending rails and said spreader support includes a pair of said leg supports mounted respectively on said pair of rails.

18. The truck according to claim 17 wherein the pair of leg supports include a pair of anchor legs which are, respectively rigidly attached to the pair of rails and a pair of longitudinally extensible and retractable locating legs, which are supported by the anchor legs and from which the spreader depends.

19. The truck according to claim 18, wherein a linear drive device is situated between each anchor leg and a respective one of the locating legs.

* * * * *

UNITED STATES PATENT AND TRADEMARK OFFICE
CERTIFICATE OF CORRECTION

PATENT NO. : 5,618,002
DATED : April 8, 1997
INVENTOR(S) : Gary Cervelli et al

It is certified that error appears in the above-indentified patent and that said Letters Patent is hereby corrected as shown below:

Column 6, line 17, after "actuating", insert --means--.

Column 8, line 8, delete the comma.

Signed and Sealed this

Seventh Day of October, 1997

*Attest:*

BRUCE LEHMAN

*Attesting Officer*     Commissioner of Patents and Trademarks

US005618002B1

REEXAMINATION CERTIFICATE (3921st)

United States Patent [19]
Cervelli et al.

[11] B1 5,618,002
[45] Certificate Issued Nov. 2, 1999

[54] TRUCK WITH RETRACTABLE SPREADER MECHANISM

[75] Inventors: Gary Cervelli, Coram; Walter K. Titcomb, Ronkonkoma, both of N.Y.

[73] Assignee: Trius, Inc., Bohemia, N.Y.

Reexamination Request:
No. 90/004,925, Feb. 23, 1998

Reexamination Certificate for:
Patent No.: 5,618,002
Issued: Apr. 8, 1997
Appl. No.: 08/602,080
Filed: Feb. 15, 1996

Certificate of Correction issued Oct. 7, 1997.

[51] Int. Cl.⁶ .............................. B60P 01/36; B65G 31/04
[52] U.S. Cl. ............................................. 239/657; 239/672
[58] Field of Search .................................... 239/657, 672; 298/7; 414/528

[56] References Cited

U.S. PATENT DOCUMENTS

| 3,189,355 | 6/1965 | Swenson et al. ....................... 239/657 |
| 3,620,458 | 11/1971 | Rath ........................................ 239/657 |
| 4,886,214 | 12/1989 | Musso, Jr. et al. ................. 239/657 X |
| 5,310,119 | 5/1994 | Musso, Jr. et al. ................. 239/657 X |
| 5,397,172 | 3/1995 | Musso, Jr. et al. ................... 298/22 R |
| 5,400,974 | 3/1995 | Musso, Jr. et al. ................. 239/657 X |
| 5,618,002 | 4/1997 | Cervlli et al. ........................... 239/657 |

FOREIGN PATENT DOCUMENTS

| 5-76224 | 3/1993 | Japan ...................................... 239/676 |

OTHER PUBLICATIONS

Hi–Way Model DO catalogue.
Air–Flo Hopper Spreaders Model AF24–D Series catalogue.
Hi–Way Model E–2020 Spreader catalogue (1977).
Hi–Way Manual No. 72400–X.
Swenson Spreader Drawings (Jul. 18, 1983).
Air–Flo Flo 'N Dump catalogue.
Swenson All Purpose Body catalogue (Oct. 1995).
Translation of Japanese Appln. No. 5–76224 (Mar. 30, 1993).

*Primary Examiner*—Janice L. Krizek

[57] ABSTRACT

A spreader mechanism having a rear operating position for spreading the material discharged from the truck body at the rear end of the truck body and a forward storage position clear of the rear end of the truck body. According to the invention, the spreader support has at least one longitudinally extending leg support mounted on the truck frame for longitudinal movement of the spreader between the rearward operating position and a forward storage position forward of the tailgate of the truck body.

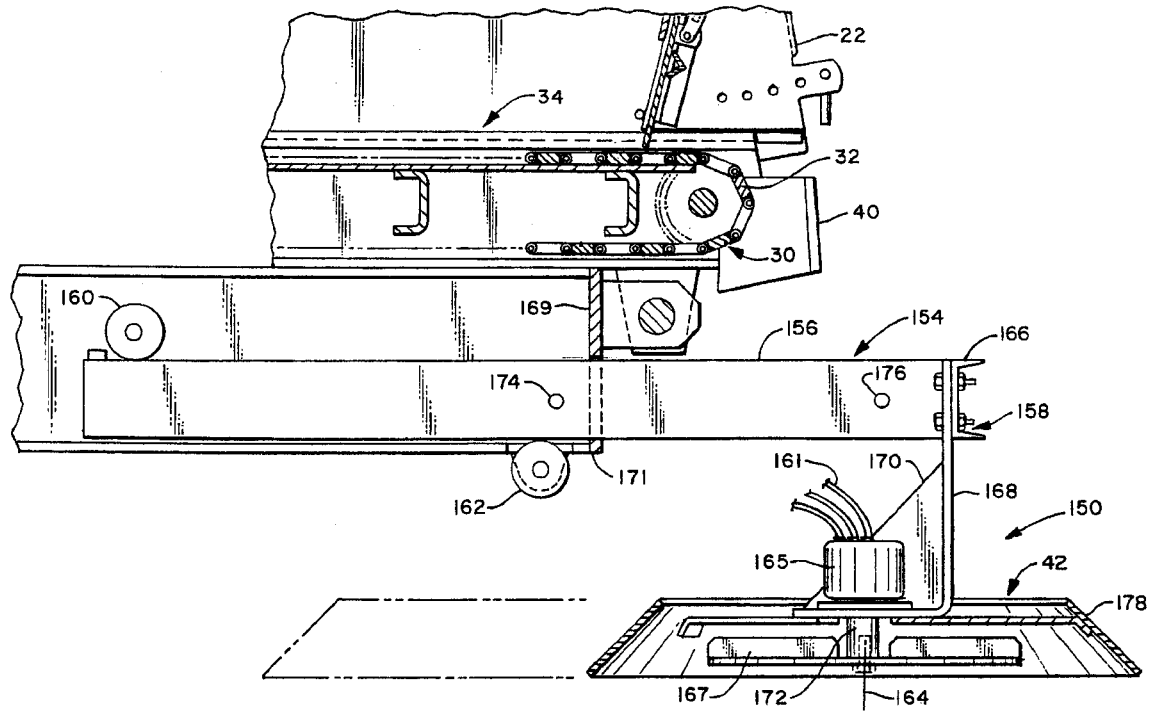

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–19 is confirmed.

* * * * *